United States Patent [19]

Gagliani

[11] 4,241,193

[45] Dec. 23, 1980

[54] POLYIMIDES

[75] Inventor: John Gagliani, San Diego, Calif.

[73] Assignee: International Harvester Company, Chicago, Ill.

[21] Appl. No.: 935,378

[22] Filed: Aug. 21, 1978

Related U.S. Application Data

[63] Continuation-in-part of Ser. No. 877,516, Feb. 13, 1978, abandoned.

[51] Int. Cl.² ............................................. C08J 9/02
[52] U.S. Cl. ............................................. 521/77; 427/373; 521/99; 521/185; 521/918; 528/183; 528/229; 528/352; 528/353
[58] Field of Search ................ 521/77, 185, 918, 370; 427/373

[56] References Cited

U.S. PATENT DOCUMENTS

| | | | |
|---|---|---|---|
| 3,726,834 | 4/1973 | Acle, Jr. | 260/2.5 N |
| 3,793,281 | 2/1974 | Acle, Jr. | 260/2.5 N |
| 3,966,652 | 6/1976 | Gagliani et al. | 260/2.5 N |

*Primary Examiner*—Morton Foelak
*Attorney, Agent, or Firm*—LeBlanc, Nolan, Shur & Nies

[57] ABSTRACT

Polyimide foams derived from mixtures of aromatic diamines and partial esters of a benzophenonetetracarboxylic acid. The precursors are converted into polyimide foams by the application of heat; and the foams are then compressed, yielding dense, rigid, and structurally strong, intumescent materials.

8 Claims, No Drawings

POLYIMIDES

This application is a continuation-in-part of application Ser. No. 877,516 filed Feb. 13, 1978 now abandoned.

The present invention relates to polyimides and, more specifically, to novel polyimide foams which are rigid, structurally strong, and intumescent.

U.S. Pat. No. 3,966,652 issued June 29, 1976, to Gagliani et al for METHOD OF MAKING FOAMED COPOLYIMIDES AND PRODUCT OBTAINED THEREFROM discloses copolyimide foams having a number of desirable properties; for example, they are structurally stable at elevated temperatures yet remain flexible and resilient at cryogenic temperatures.

The polyimide foams disclosed in the Gagliani et al patent are improvements on those described in U.S. Pat. No. 3,726,834 issued Apr. 10, 1973, to Acle, Jr. for THERMOPLASTIC COPOLYIMIDES.

The primary object of the present invention resides in the provision of novel copolyimide foams having certain desirable properties which are present to a significantly greater extent than they are, if at all, in the foams disclosed in U.S. Pat. Nos. 3,726,834 and 3,966,652 and to novel methods for making those novel foams.

Related and also important, but more specific, objects of the invention reside in the provision of foams in accord with the preceding object:

which are structurally strong to the extent that they can be used in floor, wall, and ceiling panels, fire doors, electrical boxes, and other applications where structural strength is a requisite;

which are intumescent or fire-containing;

which have a high degree of rigidity;

which have various combinations of the foregoing attributes.

Like those described in U.S. Pat. Nos. 3,726,834 and 3,966,652, the novel foams of the present invention are prepared from precursors which are solid state solutions of a $C_1$-$C_3$ alkyl ester of 3,3′, 4,4′-benzophenonetetracarboxylic acid or mixture of such esters and two or more aromatic diamines which are free of aliphatic moieties. At least one of the diamines must be meta-substituted, and any diamines which are not meta-substituted must be para-substituted. Also, the imide-forming functionalities (the amino and carboxylic moieties) should be present in substantially equimolar amounts.

Exemplary of the diamines which may be employed are:
3,3′-diaminodiphenyl sulfone
4,4′-diaminodiphenyl sulfide
4,4′-diaminodiphenyl sulfone
3,5-diaminopyridine
2,6-diaminopyridine
3,3′-diaminodiphenyl ether
4,4′-diaminodiphenyl ether
m-phenylenediamine
p-phenylenediamine The monomeric precursors are prepared by first reacting 3,3′,4,4′-benzophenonetetracarboxylic acid, or, preferably, its dianhydride and an esterfying agent to form an alkyl diester. The preferred esterfying agents are methyl, ethyl, propyl, and isopropyl alcohols (other alkyl alcohols can also be used as the esterfying agent-solvent. Changing the alkyl group of the esterfying agent affects the curing rate of the product and properties associated with the resinous nature of the material such as tackiness, drying time, etc.). Ethanol is in many cases preferred because of its widespread availability, low cost, lack of toxicity and other attributes.

The esterification reaction is followed by the addition of the aromatic diamines, which are allowed to dissolve in the reaction mixture, the temperature being kept below the reflux temperature of the esterfying agent and low enough to avoid polymerization. Excess alcohol can be removed from the resulting product at reduced pressure until it becomes a thick syrup.

Graphite and/or other fibers and fillers can be added to the resulting composition to impart wanted properties to the final product. A surfactant can also be added with stirring to control the pore size and/or the cellular structure of the foam which will ultimately be made. From 0.1 to 10 parts by weight of surfactant for each 100 parts of resin constituent can be employed for this purpose.

One suitable surfactant is Union Carbide L-5420 silicone surfactant. That company's L-5410 and L-530 surfactants are also suitable as are various silicone surfactants available from Dow Chemical and General Electric.

Any excess solvent remaining after the dissolution of the diamines is removed by drying the viscous composition at a temperature in the range of ca. 76°–104° C. This leaves an amorphous resinoid which can be converted to a copolyimide foam by heating it to a temperature in the range of ca. 230°–315° C. for ca. 15–30 minutes. In a typical application of the present invention the viscous composition existing after the dissolution of the diamines will be coated onto a metallic or non-metallic substrate and then dried and foamed as just described in a single, one-step operation.

In accord with the present invention the foam resulting from the heating of the resinoid precursor is compressed by applying a pressure of 3–20 psig to it, preferably in a preheated mold, at a temperature generally equal to the maximum temperature reached in the foaming step and typically on the order of 315° C. The application of the pressure is continued until a permanent set of the foam is achieved. The amount of time this will require will depend upon the dimensions of the workpiece; but it will, in general, be between three and ten minutes.

The novel post-treatment just described produces a strong, rigid foam which has the important advantage that it is capable of keeping fire from spreading. This is of obvious importance in the protection of structures and equipment and in the preservation of human and other animal life.

If longer periods of application of pressure (i.e., those tending toward 10 minutes) are employed, the product foam will have a hard, high density skin enveloping a low density core. This composite construction is advantageous for many applications of my invention.

In applications where a skin is not wanted, the pressure is applied for a shorter period; viz., one tending toward three minutes. This results in the product foam being of uniform density throughout.

Instead of burning, the novel foams of the present invention form a fire resistant, surface char when subjected to intense heat. Furthermore, the surface char forms without producing smoke or toxic byproducts unlike conventional cellulosic or plastic insulating materials. This characteristic is of obvious importance in applications involving the presence of human or other animal life in closed or artificially supported environments.

Also, the novel polyimide foams disclosed herein remain rigid and structurally intact in the presence of intense heat. This makes them significantly superior as fire containment barriers to the metallic, ceramic, cellulosic, plastic, and glassy materials conventionally used for this purpose as the latter soften, or melt, and collapse under the same conditions causing catastrophic failures and allowing fire to propagate.

Certain important objects of the present invention have been identified above. Other important objects and advantages and additional novel features of the present invention will be apparent to those skilled in the relevant arts from the foregoing general description of the invention, from the appended claims, and from the following example, which is intended to illustrate and not restrict the scope of the invention.

3,3′,4,4′-Benzophenonetetracarboxylic acid dianhydride (322.2 g, 1.0 M) was dissolved in 330 ml of reagent grade ethanol by refluxing the mixture for 30–60 minutes. To the solution was added 124.1 g of 4,4′-diaminodiphenyl sulfone (0.5 M) and 54.6 g of 2,6-diaminopyridine (0.5 M). That mixture was refluxed for 15–30 minutes. L-5420, a Union Carbide silicone surfactant, 11.8 g, was added to the batch which was then stirred for one hour.

To a 300 g portion of the resulting syrup composition was added 90 g of ¼ inch long graphite fibers and 90 g of reagent grade ethanol. The mixture was stirred to insure complete wetting of the fibers.

The putty-like composition which resulted was dried by spreading a 0.6 cm (0.25 in.) thick layer of the composition on an aluminum foil and heating it at 76°–104° C. (170°–220° F.) in a circulating air oven for 2–16 hours. Foaming was accomplished by heating the dried resin at 315° C. (600° F.) for 30 minutes.

This was followed by a compression of the foam to a thickness of 1.25–2.5 cm (0.5–1.0 in.) in a press preheated at 315° C. (600° F.). Seven pounds of pressure (gage) was applied, and the pressure was maintained for 4 minutes.

The process just described produced a high density cellular material in which graphite fibers were homogeneously distributed. The foam was rigid and had exceptional mechanical properties. It exhibited high resistance to intense heat sources without distortion, loss of foam integrity, or formation of smoke or toxic gases.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes whih come within the meaning and range of equivalency of the claims are therefore intended to be embraced therein.

What is claimed and desired to be secured by Letters Patent is:

1. A process of making a rigid, intumescent, polyimide foam which comprises the steps of: preparing a resinous precursor by forming a composition which is essentially a stoichiometric mixture of aromatic diamine and tetracarboxylic acid ester constituents and dispersing a filler composed of particulate solids in said composition; heating said resinous precursor to a temperature in the range of 210°–315° C. to produce a polyimide foam artifact of selected configuration; and then heating said artifact under a pressure in the range of 3–20 psig and at a temperature in the range of 230°–315° C. for a time sufficient to produce a permanent set in said foam and thereby increase the rigidity and structural strength of the artifact.

2. The process defined in claim 1 wherein, in heating the foam artifact under pressure, it is maintained at a temperature approximating the highest temperature reached in converting the precursor to the foam.

3. The process defined in claim 1 in which the foam artifact is heated under pressure in a press and in which said press is preheated prior to processing the foam artifact therein.

4. The process defined in claim 1 in which the polyimide foam artifact is heated under pressure for a period ranging from 3 to 10 minutes.

5. The process defined in claim 1 in which any tetracarboxylic acid ester present in the precursor is a $C_1$–$C_{13}$ ester of 3,3′,4,4′-benzophenonetetracarboxylic acid and the diamines are selected from the group consisting of 3,3′-diaminodiphenyl sulfone, 4,4′-diaminodiphenyl sulfide, 3,3′-diaminodiphenyl ether, 4,4′-diaminodiphenyl ether, meta-phenylenediamine, para-phenylenediamine, 2,6-diaminopyridine, and 3,5-diaminopyridine.

6. The process defined in claim 1 together with the step of adding to the precursor before it is foamed from 0.1 to one part, based on the weight of the ester and diamine constituents, of a surfactant which is effective to control the pore size and/or cellular structure of the foam artifact into which said precursor is to be converted.

7. The process defined in claim 1 in which the tetracarboxylic acid ester constituent comprises at least one $C_1$–$C_3$ diester of 3,3′,4,4′-benzophenonetetracarboxylic acid.

8. The process defined in claim 1 wherein the filler comprises graphite fibers.

* * * * *